(12) United States Patent
Greener et al.

(10) Patent No.: US 7,539,696 B1
(45) Date of Patent: May 26, 2009

(54) SYSTEM AND METHOD FOR PROVIDING WORLD WIDE WEB-BASED SURVEY CREATION, DESIGN, DEPLOYMENT, AND RESULT COMPILATION AND TRACKING

(75) Inventors: Chris Greener, Tiburon, CA (US); David Brogan, Mill Valley, CA (US); Lesley Kahn, Sausalito, CA (US); Ron Mester, San Mateo, CA (US); Bud Werner, Carte Madera, CA (US); Alexia Moore, Sausalito, CA (US); Jackie Sapir, San Francisco, CA (US)

(73) Assignee: MarketTools, Inc., Mill Valley, CA (US)

( * ) Notice: Subject to any disclaimer, the term of this patent is extended or adjusted under 35 U.S.C. 154(b) by 441 days.

(21) Appl. No.: 09/678,430

(22) Filed: Oct. 2, 2000

Related U.S. Application Data

(60) Provisional application No. 60/157,264, filed on Oct. 1, 1999.

(51) Int. Cl.
G06F 7/00 (2006.01)
G06F 17/30 (2006.01)
G06F 17/00 (2006.01)

(52) U.S. Cl. ........................ 707/102; 707/10; 707/104.1
(58) Field of Classification Search .................. 707/1–3, 707/7, 10, 100, 102–104.1; 709/200–203, 709/217; 705/7, 10
See application file for complete search history.

(56) References Cited

U.S. PATENT DOCUMENTS

| | | | |
|---|---|---|---|
| 6,418,298 B1 * | 7/2002 | Sonnenfeld | 434/350 |
| 2001/0031454 A1 * | 10/2001 | Mintz | 434/322 |
| 2001/0052009 A1 * | 12/2001 | Desai et al. | 709/224 |
| 2002/0128898 A1 * | 9/2002 | Smith et al. | 705/10 |
| 2004/0169675 A1 * | 9/2004 | Beck et al. | 345/705 |

* cited by examiner

*Primary Examiner*—Don Wong
*Assistant Examiner*—Merilyn P Nguyen
(74) *Attorney, Agent, or Firm*—Davis Wright Tremaine LLP; Heather M. Colburn

(57) ABSTRACT

A system and method for creating, designing, and deploying World Wide Web-based surveys in a host machine using a standard web browser without requiring the need of a survey creation program at the survey designer's computer. Survey results are viewable in real time. Survey creation is accomplished from a web browser user interface that allows web content objects stored in a database to be selected, customized, positioned, resized and edited. The web content objects include a plurality of elements selectable for constructing a survey within a survey creation engine. The web content objects further include a plurality of survey templates, e-mail invitation templates, survey question and answer types, page design features, multimedia objects, and general purpose objects. Objects from outside the remote database can also be imported for inclusion in the survey.

6 Claims, 9 Drawing Sheets

SYSTEM AND METHOD FOR PROVIDING WORLD WIDE WEB-BASED SURVEY CREATION, DESIGN, DEPLOYMENT, AND RESULT COMPILATION AND TRACKING

CROSS REFERENCE TO RELATED APPLICATIONS

The present application claims priority from U.S. Provisional Patent Application Ser. No. 60/157,264, filed Oct. 1, 1999, the entire disclosure of which is incorporated herein by reference.

BACKGROUND OF THE INVENTION

1. Field of the Invention

The present invention relates generally to surveys, and more specifically, to World Wide Web-based survey creation, design, deployment, and result compilation and tracking.

2. Background of the Invention

Surveying is an important tool utilized in performing research and is generally used to collect data relating to people's opinions, preferences, knowledge and availability. In the context of market research, the collected data drives many decisions in the business world. More generally, surveys are conducted with varying degrees of formality to plan activities, gauge community opinions, solicit ideas and feedback, and gather information of a desired nature.

Conventional surveying techniques include paper-based surveys conducted through the mails, telephone surveys, and face-to-face interviews. As noted above, surveying is also often performed on an informal basis to gather input and solicit feedback on a particular topic by asking a group of people the same set of questions on the topic. Thus, a family reunion can be planned by asking family members to submit a preferred time and place for the reunion. The same family members may also be asked to submit alternative times and places together with preference rankings for each.

Since the introduction of the World Wide Web (WWW) on the Internet, market researchers and individuals are increasingly using the WWW as a medium for executing surveys and obtaining feedback. Individuals and organizations conventionally have accessible HTML documents (web pages) which are served from server machines and accessed by a web browser. These web pages conventionally include an e-mail address providing a visitor to the web page with a mechanism for responding to the content of the web page.

In addition, the WWW provides a medium for delivering summarized survey response data back to organizations and individuals that wish to make inferences from it. By coupling the mechanism used to execute WWW-based surveys and the WWW mechanism used to deliver summarized survey response data, it is possible to deliver survey results in real time.

However, despite advances in WWW-based surveys, there remains a need for an improved system and method that provides quick and easy construction and publication of WWW-based surveys on the Internet and which further provides quick access to the survey results for analysis. Preferably the system and method enable a user to collect feedback and survey groups of people for a plurality of purposes including business, personal/social, education, and community.

SUMMARY OF THE INVENTION

The present invention provides a system and method for creating, designing, and deploying WWW-based surveys in a host machine using a standard web browser without requiring the need of a survey creation program at the survey designer's computer. As such, the system and method is usable by an individual who has no knowledge of Hyper Text Mark-Up Language (HTML) or any other computer language.

The system and method are preferably hosted in a server machine coupled to a communications network and include functionality for providing survey results in real time.

Survey creation is accomplished from a web browser user interface that allows web content objects stored in a remote database to be selected, customized, positioned, resized and edited. The web content objects include a plurality of elements selectable for constructing a survey within a survey creation engine. The web content objects further include a plurality of survey templates, e-mail invitation templates, survey question and answer types, page design features, multimedia objects, and general purpose objects. Objects from outside the remote database can also be imported for inclusion in a survey. In this manner a logo or trademark can be included in a survey.

A plurality of survey templates are provided to facilitate the creation of the survey. Templates include sample surveys in subject areas including business, personal/social, education, work, and community. The content of each template can be easily edited and customized to conform to the needs of the user.

In a preferred embodiment of the invention, survey recipients are solicited to respond to a survey by means of e-mail messages from the user. The web content objects include a plurality of e-mail invitation templates customizable by the user.

The survey questions are customizable to provide for survey questions including choice questions, multiple choice questions, pull-down questions, matrix questions, constant sum questions, comment questions, spinner questions, ranking questions, importance/satisfaction questions, yes/no questions, and open-ended questions. In addition to question and answer format, question and answer content is customizable.

The page design objects further provide for customization of the layout of the survey by providing a selection of various types of customizable survey design items including standard questions, titles, captions, progress bars, rules, panels, images, and video clips. The design objects further include options including survey background design, font and color scheme.

The system and method further provide for the customization and design of survey reports including the format of the displayed results and permissions relating to the display of survey results. In a preferred embodiment of the invention, the user determines who is granted permission to view pre-selected portions of the survey results.

In another aspect of the invention, a list management process accepts a list of survey recipients from the user and contacts pre-selected survey recipients to solicit responses to the survey. Alternatively, a panel management process provides a pre-selected panel from which survey respondents are solicited.

In yet another aspect of the invention, a survey creation wizard is provided for guiding the user in the creation of a survey.

In yet another aspect of the invention, a help facility is provided to help the user in the creation and design of the survey, and in the interpretation of survey results.

In another aspect of the invention, the survey and the responses thereto are saved and stored in the host machine.

In yet another aspect of the invention, sophisticated control over processing logic is provided.

In yet another aspect of the invention, the system and method are extensible and can easily support new requirements and Internet applications as they evolve.

In yet another aspect of the invention, survey result reports can be downloaded into spreadsheet or presentation software.

Other advantages and features of the present invention will be apparent from the drawings and detailed description as set forth below.

DETAILED DESCRIPTION OF THE PREFERRED EMBODIMENT

The present invention relates to World Wide Web-based survey creation, design, deployment, and result compilation and tracking.

Figure 1:
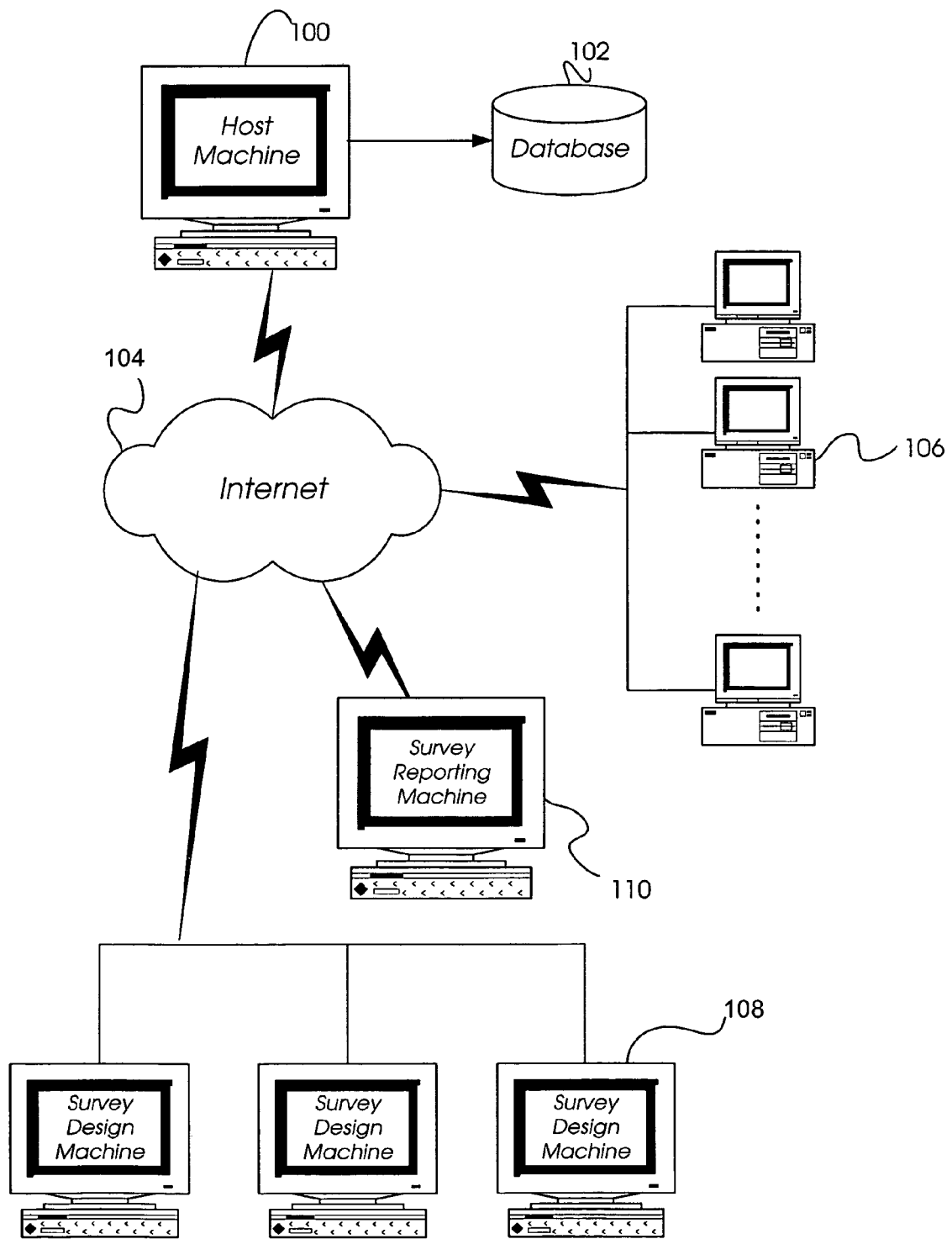
FIG. 1 is a schematic diagram illustrating interconnected computers and a database configured in accordance with the invention.

FIG. 1 is a schematic diagram illustrating a host machine 100 connected to a database 102 and to a communications network such as the Internet 104. A plurality of client machines 106, survey design machines 108, and a survey reporting machine 110 are shown coupled to the Internet 104. The host machine 100 hosts the system of the present invention and the client machines 106, having installed web browsing applications, provide survey recipients and survey respondents with access to the surveys hosted on the host machine 100. Surveys are designed by survey designers accessing the host machine 100 from survey design machines 108.

When a survey is accessed from a client machine 106, a server process on the host machine 100 retrieves a saved survey including web content objects from the database 102 and objects provided by the user, and assembles them into a survey which is served to the client machine 106. The web browsing applications of the client machines 106 allow survey recipients to view and respond to surveys served by the host machine 100 through the Internet 104.

When a survey response is submitted, the host machine 100 processes and stores the response in the database 102. The responses are viewable in real time by the survey designer at a survey design machine 108. Additional qualified users are allowed access to the survey results. For example, a qualified user including a survey respondent may be permitted to view survey results. Additionally, a qualified user including a non-respondent user may be permitted to view survey results, such as by utilizing survey reporting machine 110. Survey reporting machine 110 may further provide for the downloading of survey results for use in presentation or spreadsheet software.

Figure 2:
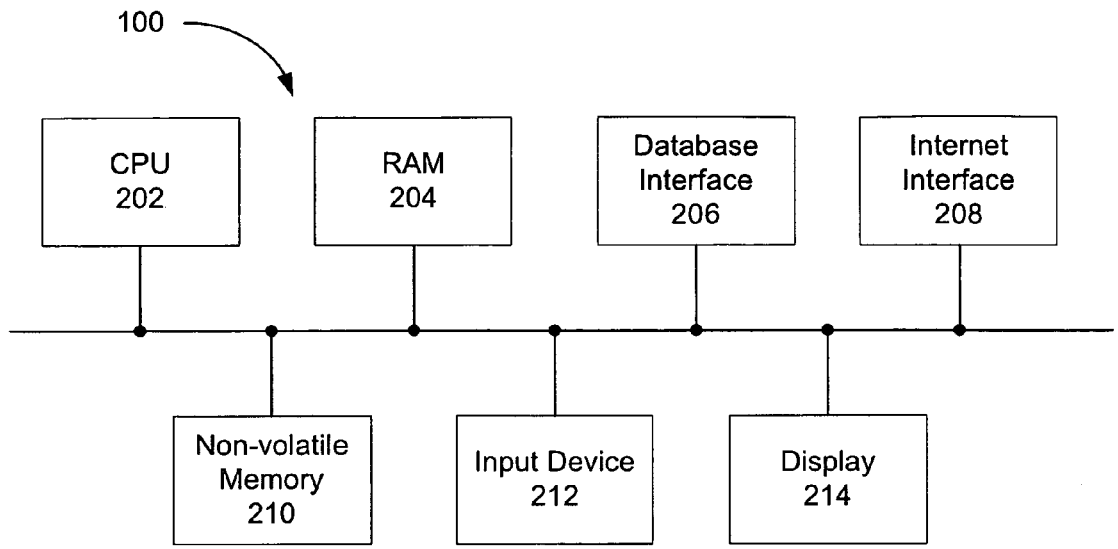
FIG. 2 is a block diagram of the host machine shown in FIG. 1, in accordance with the invention.

FIG. 2 is a block diagram illustrating components of the host machine 100 shown in FIG. 1. The host machine 100 includes a CPU 202, RAM 204, non-volatile memory 210, an input device 212, a display 214, and an Internet interface 208 for providing access to the Internet 104. The host machine 100 also includes a database interface 206 in order to allow access to database 102.

Figure 3:
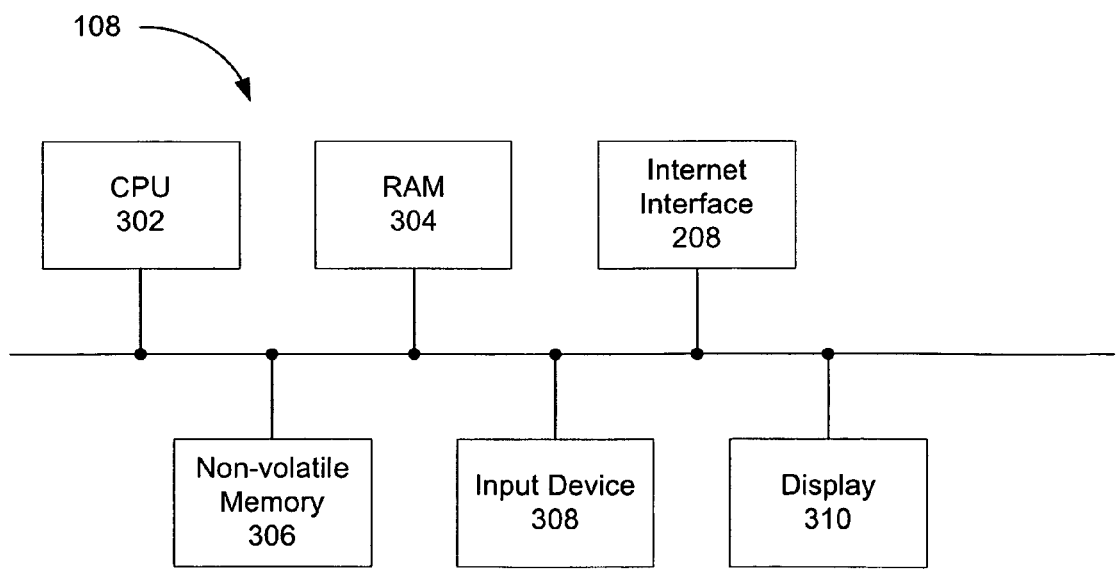
FIG. 3 is a block diagram of a user's survey design machine shown in FIG. 1, in accordance with the invention.

FIG. 3 is a block diagram illustrating components of the survey design machine 108 shown in FIG. 1. The survey design machine 108 includes a CPU 302, RAM 304, non-volatile memory 306, an input device 308, a display 310, and an Internet interface 208 for providing access to the Internet 104.

Figure 4:
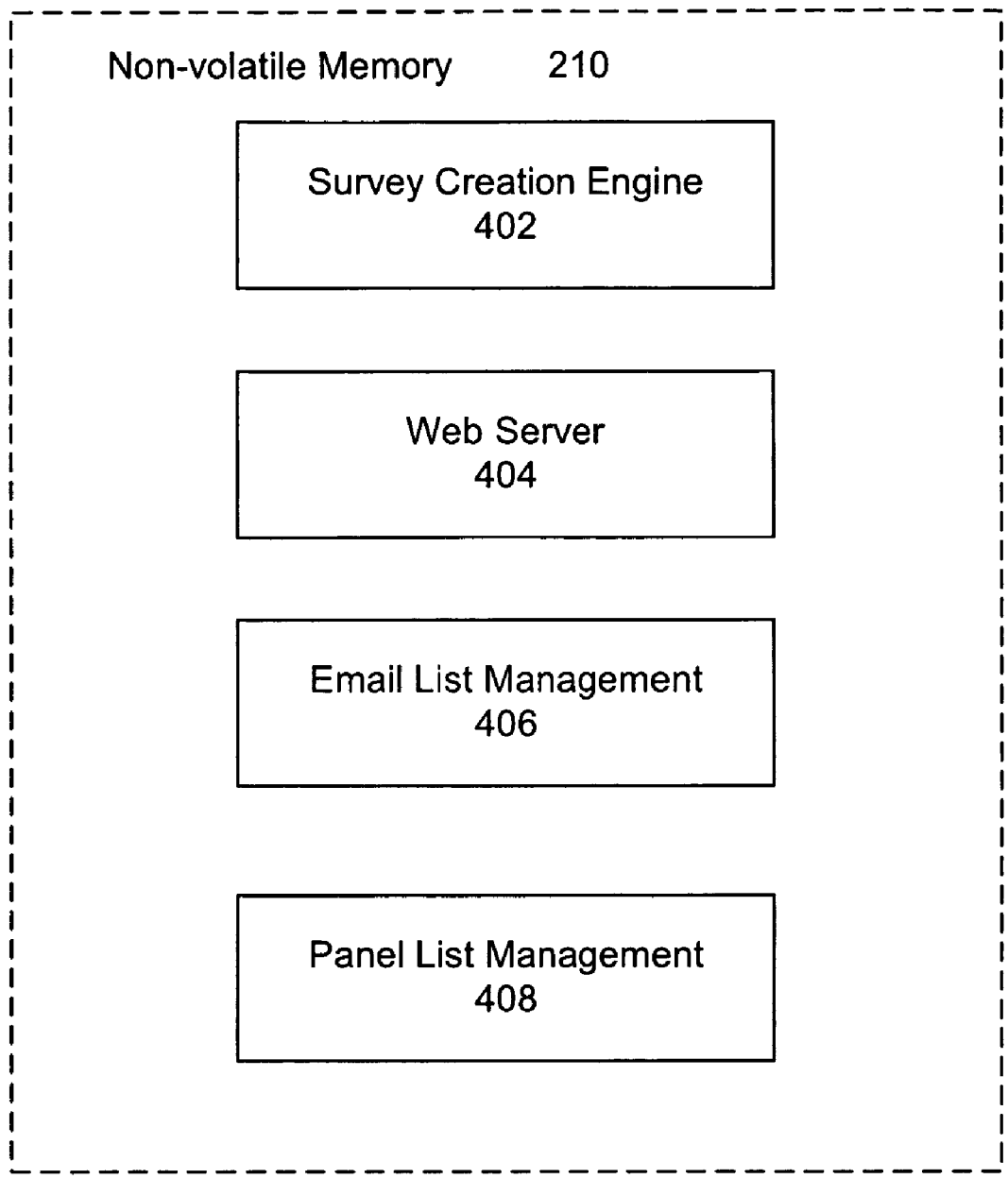
FIG. 4 is a block diagram of one embodiment of the non-volatile memory module located within the host machine of FIG. 2.

FIG. 4 is a block diagram illustrating one embodiment of the non-volatile memory 210. The non-volatile memory 210 includes a survey creation engine 402 which enables a user to create, design and deploy web-based surveys. The survey creation engine program 402 preferably includes a wizard feature for facilitating the creation of a survey. The created surveys can contain a number of survey elements, including titles, questions, greetings, captions, buttons, images, video, panels, progress bars, and rules.

The non-volatile memory 210 also includes a web server 404 to serve surveys to survey recipients and survey respondents, receive and compile survey results, serve survey results, and allow access through the Internet 104 to the survey creation engine 402. The non-volatile memory 210 further includes an e-mail list management facility 406 to facilitate management of recipient e-mail lists, and a panel list management facility 408 to facilitate management of the lists of panelists or potential survey respondents.

Figure 5:
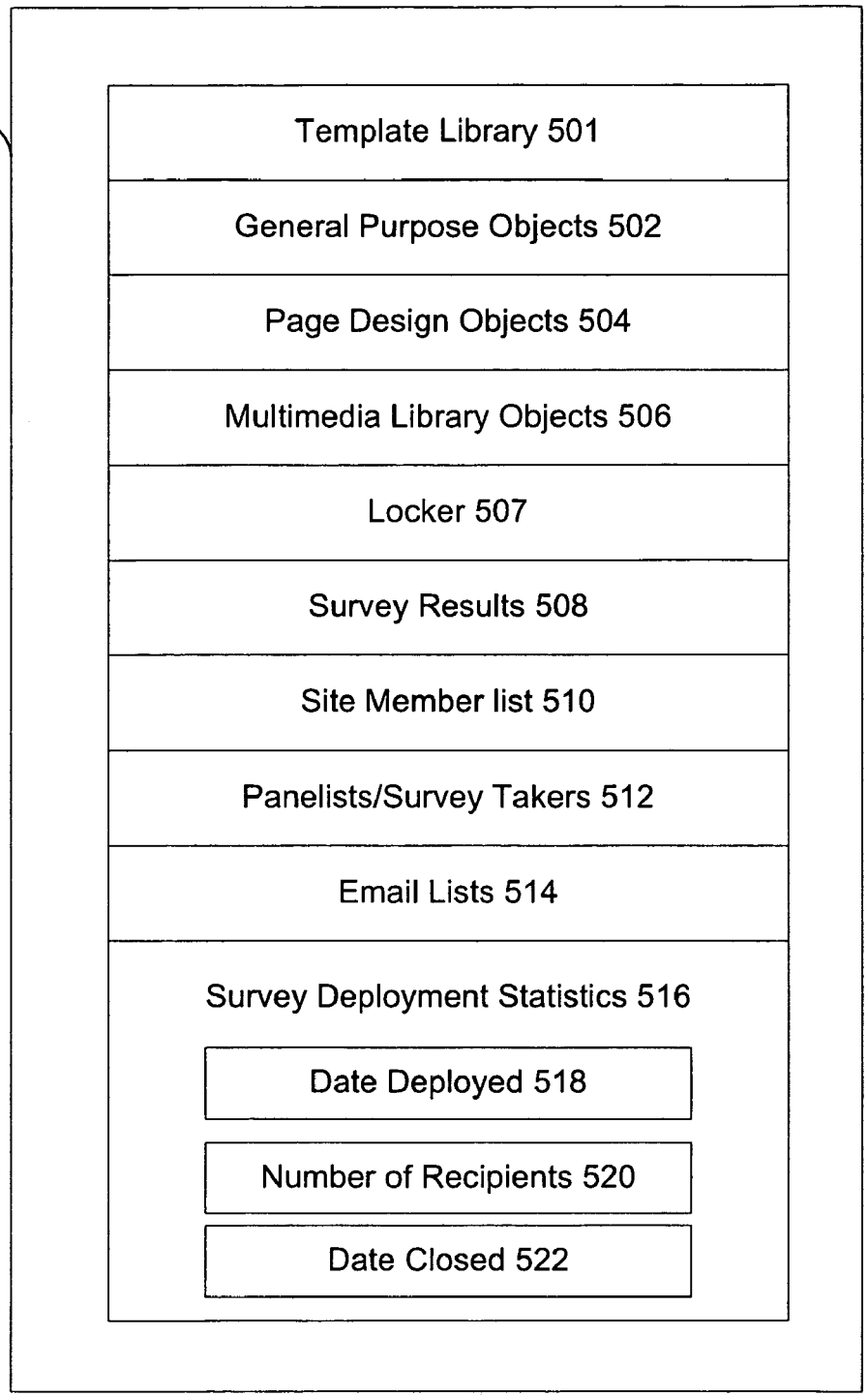
FIG. 5 is a block diagram of one embodiment of the database shown in FIG. 1.

FIG. 5 is a block diagram illustrating one embodiment of the database 102 shown in FIG. 1. The database 102 includes a plurality of web content objects including a template library 501 having survey and e-mail templates, general purpose objects 502, page design objects 504, multimedia library objects 506, a locker 507, survey results 508, site member list(s) 510, panelist/survey taker list 512, e-mail lists of survey recipients and panelists 514, and survey deployment statistics 516. The general purpose objects 502, page design objects 504, and multimedia library objects 506 provide a survey designer with common survey-type objects that can be selected and included within a survey. The objects are preferably customizable to meet the survey designer's needs. Furthermore, functionality is included in the web server 404 that allows a user accessing the survey creation engine 402 to have a personal password-protected locker 507 in database 102 for providing a place to save and store surveys and survey results. Additionally, recipient e-mail lists may be stored in the locker 507.

The survey deployment statistics 516 track features including the date deployed 518, the number of recipients 520, and date closed 522.

Figure 6:
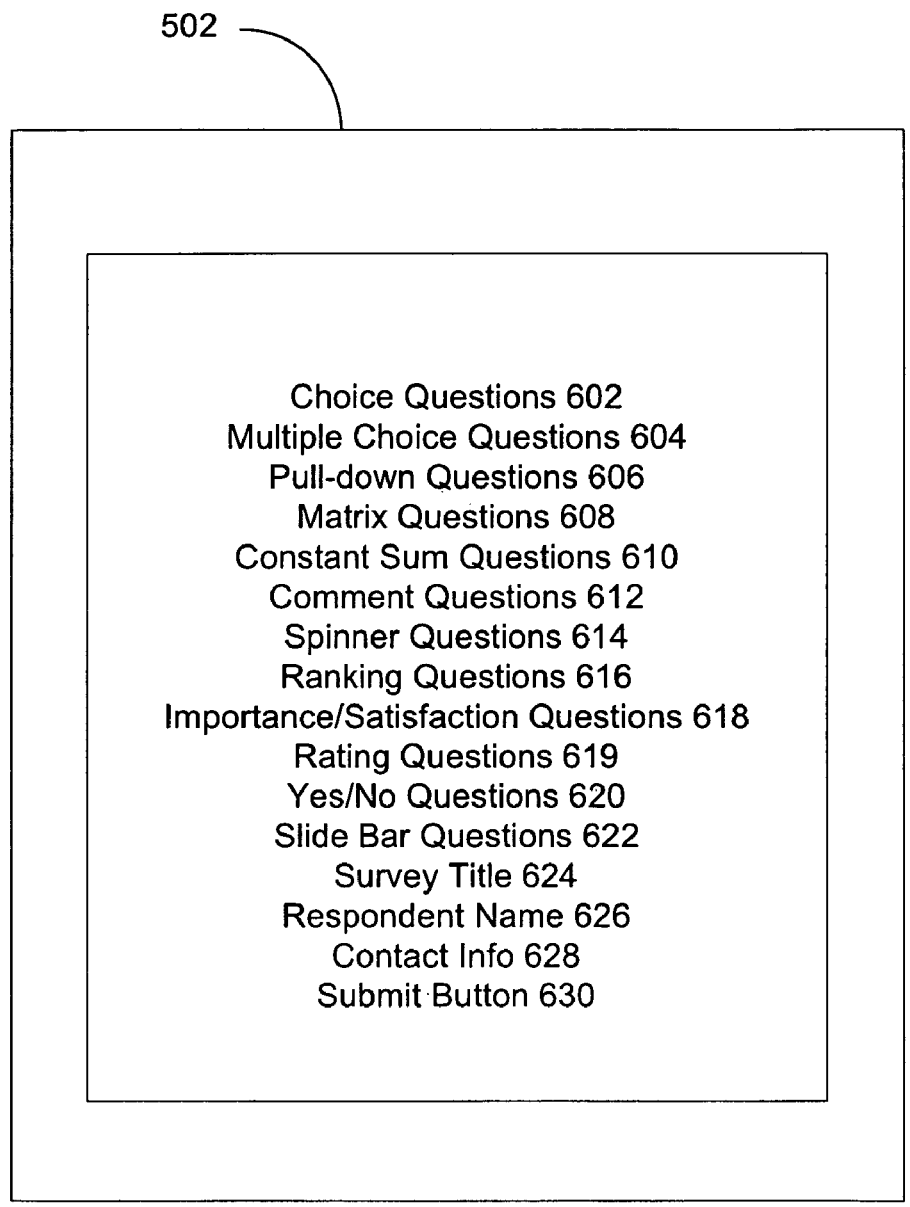
FIG. 6 is a block diagram of one embodiment of the survey objects in the database of FIG. 5.

One of the key elements in a survey is the survey question. The survey question can be constructed in various different types of question formats. Referring to FIG. 6, general purpose objects 502 include a list of a plurality of different types of question and answer formats that can be used in a survey.

These formats include choice questions 602, multiple choice questions 604, pull-down questions 606, matrix questions 608, constant sum questions 610, comment questions 612, spinner questions 614, ranking questions 616, importance/satisfaction questions 618, rating questions 619, yes/no questions 620, and slide bar questions 622. The general purpose objects 502 further include a survey title 624, respondent names 626, contact information 628, and submit buttons 630. These general purpose objects represent standard objects used in web-based surveys.

Figure 7:
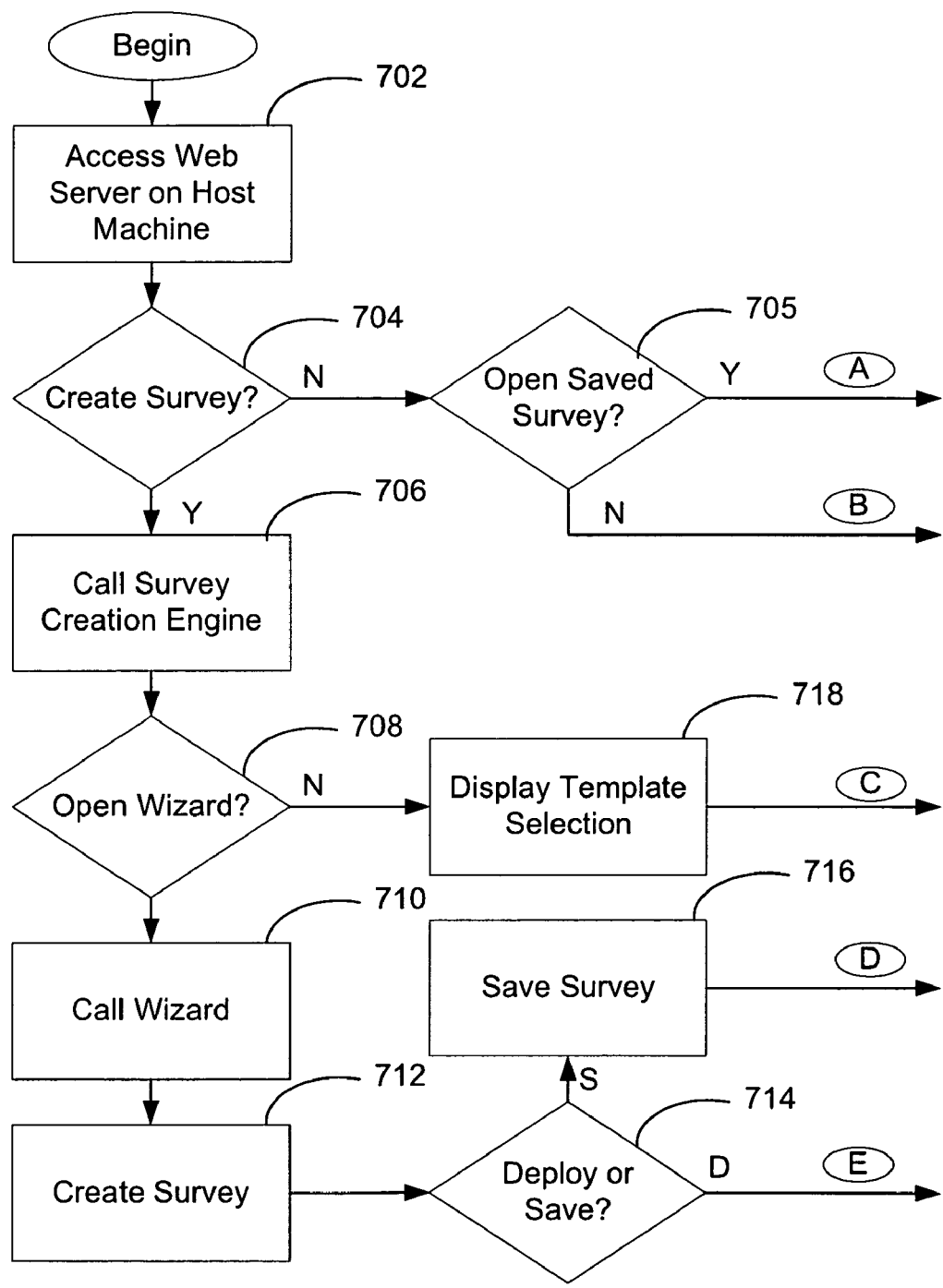
FIGS. 7, 8, 9, 10, 11, and 12 illustrate a preferred method of practicing the invention.

FIG. 7 illustrates a preferred embodiment of a method 700 for creating, designing, and deploying a web-based survey. The method 700 includes a step 702 in which a user, from a survey design machine 108, accesses the web server 404 of the host machine 100. In a step 704 the user decides whether to create a new survey. If the user decides to create a new survey, the survey creation engine 402 is called in a step 706; otherwise in a step 705 the user decides whether to open a saved survey.

The user decides in a step 708 whether to use the wizard facility in creating the new survey. If the user decides not to use the wizard facility, templates are displayed in a step 718. Otherwise, a step 710 cells the wizard facility and in a step 712, the user is guided by the wizard facility in the creation of the new survey. In a step 714 the user decides whether to deploy or save the survey. If the user decides to save the survey, then in a step 716 the survey is saved and the user selects further options as described hereinafter with reference to FIG. 10. Survey deployment is described with reference to FIG. 12.

Figure 8:
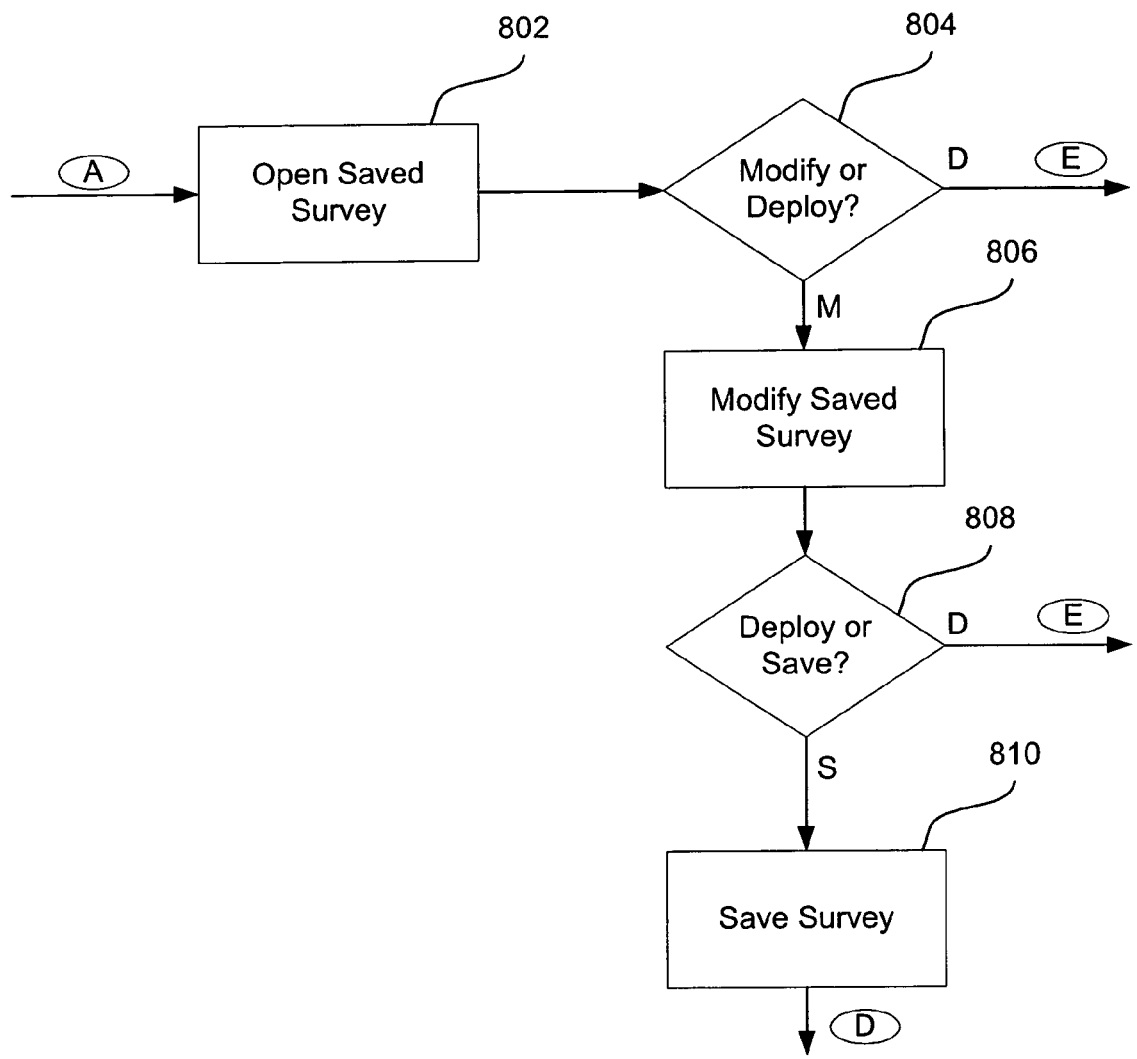

With reference to FIG. 8, if in step 705 the user decides to open a saved survey, the saved survey is opened in a step 802. In a step 804, the user decides whether to modify or deploy the survey. If the user decides to modify the survey, the survey is modified in a step 806. The user may then decide to deploy or save the survey in a step 808. If the user decides to save the survey, it is saved in a step 810.

Figure 9:
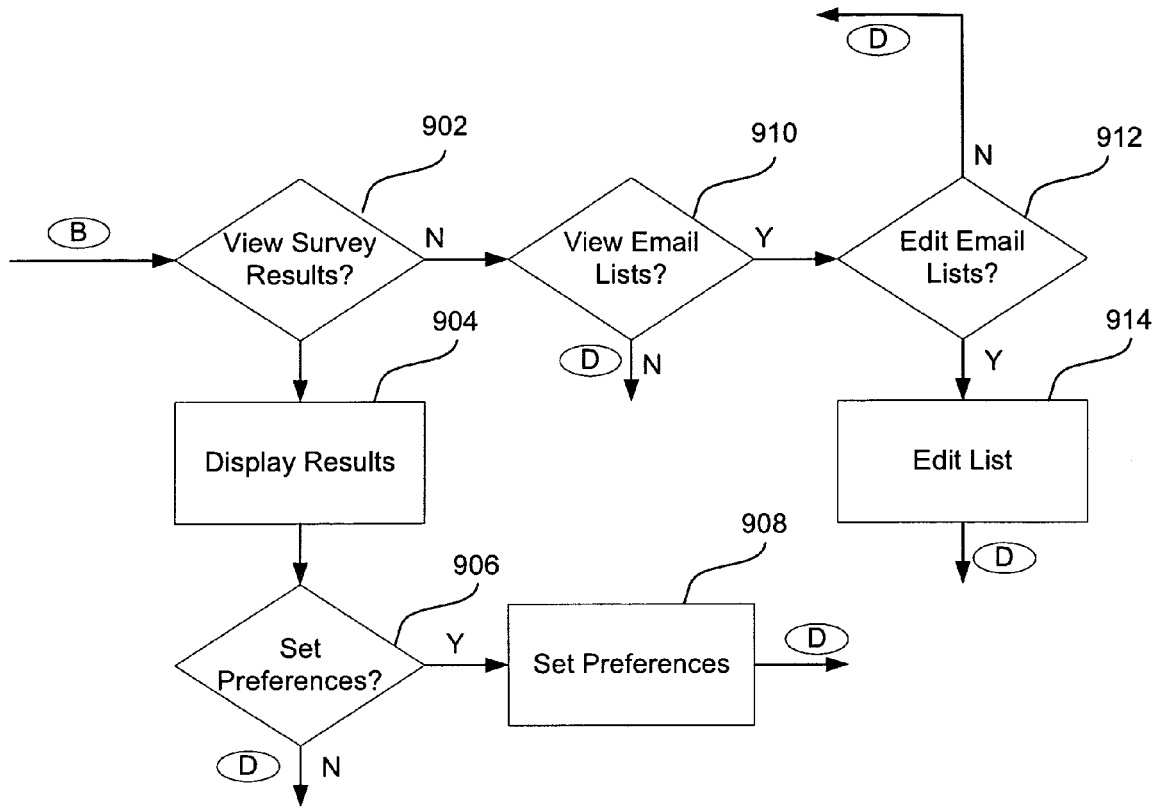

With reference to FIG. 9, if in step 705 the user decides not to open a saved survey, then in a step 902 the user decides whether to view survey results. In a step 904, the survey results are displayed and in a step 906 the user decides whether to set preferences for those persons that can view the survey results. In a step 908 the user sets viewer preferences.

If in step 902 the user decides not to view survey results, then in step 910 the user decides whether to view e-mail lists used to solicit survey respondents. In a step 912 the user decides whether to edit the e-mail lists. In a step 914 the user edits the e-mail lists.

Figure 10:
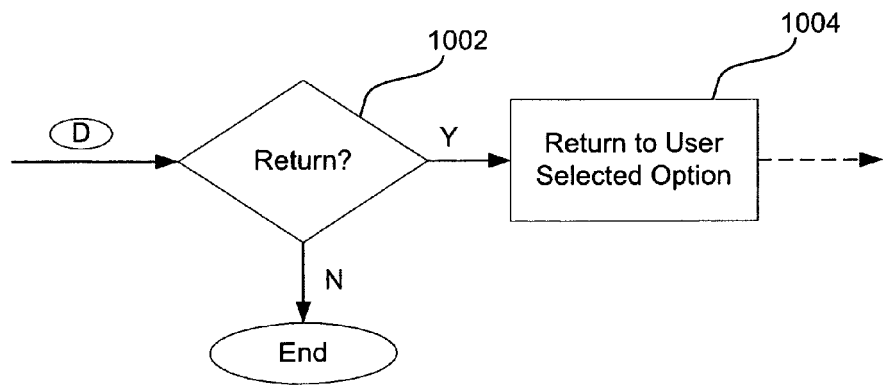

With reference to FIG. 10, the method in a step 1002 enables the user to select options including whether to view a saved survey, create a new survey, customize a template, view survey results, and edit e-mail lists. If the user does not select an option, the method ends. Otherwise, the user is returned to the selected option in a step 1004.

Figure 11:
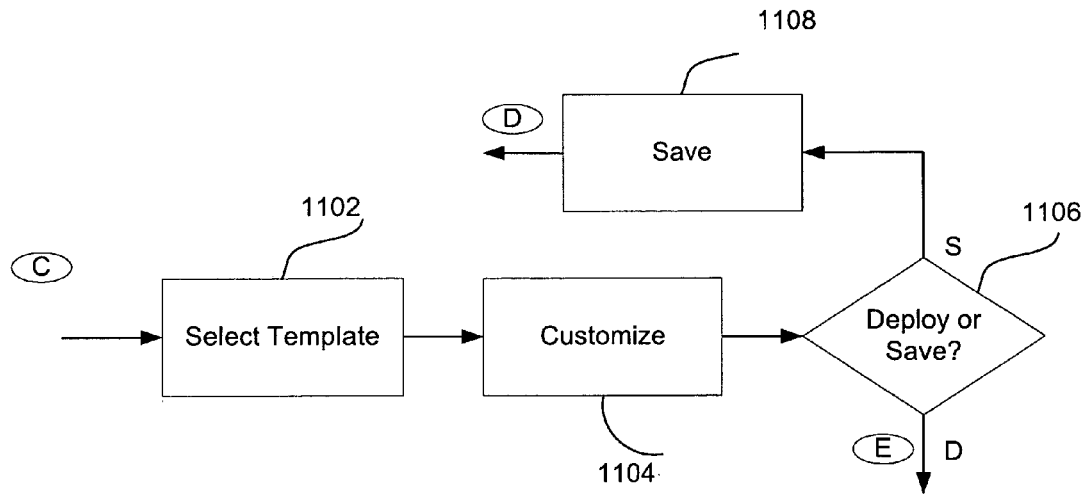

FIG. 11 illustrates the survey creation component of the method of the invention. In a step 1102, the user selects a template from the displayed template selection. Each selected template is customized in a step 1104. In a step 1106 the user decides whether to save or deploy the created survey and, if the user so decides, in a step 1108 the survey is saved.

Figure 12:
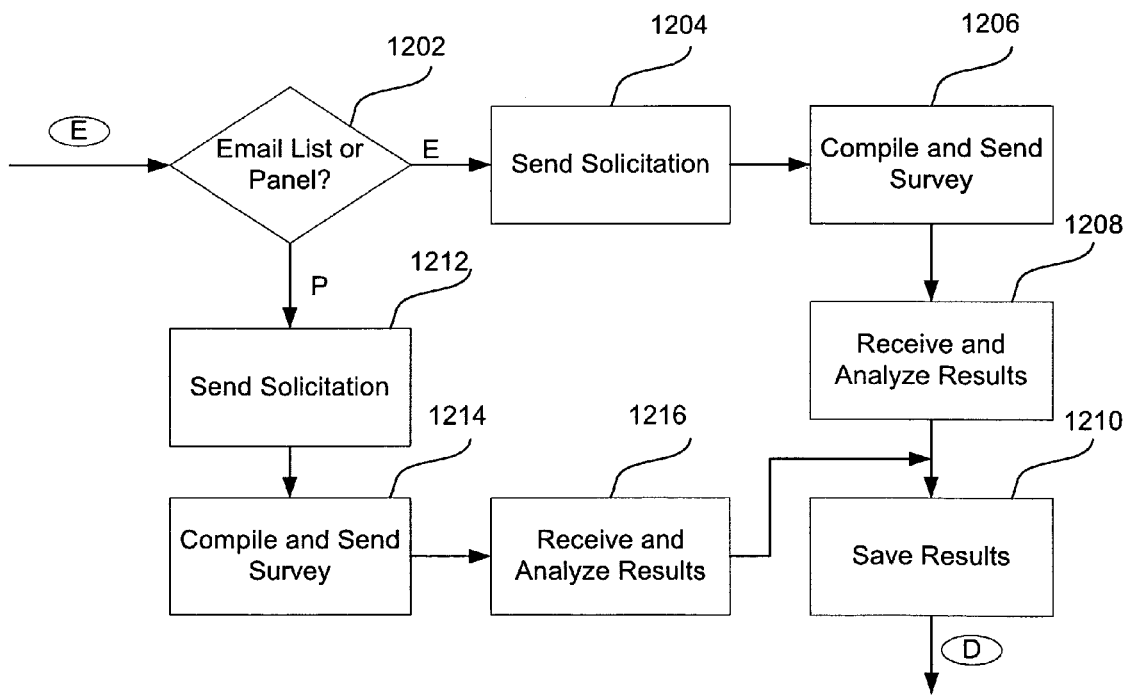

With reference to FIG. 12, the user deploys a survey by deciding in a step 1202 whether to use an e-mail list or a panel. In case the user chooses to use the e-mail list, then in a step 1204 each recipient on the e-mail list is mailed a solicitation to take the survey. The solicitation preferably includes a link to the survey on the host machine 100. In a step 1206 the web server 404 compiles the survey from the web content objects and serves the survey to the survey respondent. Survey responses are received and analyzed in a step 1208 and saved in a step 1210.

If in step 1202 the user chooses to use the panel of survey recipients, then in a step 1212 each panelist is mailed a solicitation to take the survey. Preferably the panelists are solicited by e-mail. The solicitation further preferably includes a link to the survey on the host machine 100. In a step 1214 the web server 404 compiles the survey from the web content objects and serves the survey to the survey respondent. Survey responses are received and analyzed in a step 1216 and saved in a step 1210.

Several embodiments are specifically illustrated and/or described herein. However, it will be appreciated that modifications and variations are covered by the above disclosure and within the purview of the appended claims without departing from the spirit and intended scope thereof.

What is claimed is:

1. A system for use with a network, the system comprising:
   a database;
   a host machine having a processor, a database interface configured to access the database, a network interface configured to provide access to the network, and a survey creation engine configured to create surveys, the database configured to store the created surveys; and
   a survey design machine having a network interface configured to provide access to the network and a network browser configured to communicate with the survey creation engine via the network to allow a user of the survey creation machine to create a survey through the survey creation engine of the host machine, the survey creation engine being configured to provide to the network browser of the survey design machine at least one function to resize web content objects to be added during survey creation.

2. The system of claim 1 wherein the web content objects include e-mail invitation templates.

3. A system for use with a network, the system comprising:
   a database;
   a host machine having a processor, a database interface configured to access the database, a network interface configured to provide access to the network, and a survey creation engine configured to create surveys, the database configured to store the created surveys; and
   a survey design machine having a network interface configured to provide access to the network and a network browser configured to communicate with the survey creation engine via the network to allow a user of the survey creation machine to create a survey through the survey creation engine of the host machine, the survey creation engine being configured to provide to the network browser of the survey design machine at least one function to select progress bars to be added by the survey creation engine.

4. A system for use with a network, the system comprising:
   a database;
   a host machine having a processor, a database interface configured to access the database, a network interface configured to provide access to the network, and a survey creation engine configured to create surveys, the database configured to store the created surveys; and
   a survey design machine having a network interface configured to provide access to the network and a network browser configured to communicate with the survey creation engine via the network to allow a user of the survey creation machine to create a survey through the survey creation engine of the host machine, the survey creation engine being configured to provide to the network browser of the survey design machine at least one function to perform survey background design.

5. A system for use with a network, the system comprising:

a database;

a host machine having a processor, a database interface configured to access the database, a network interface configured to provide access to the network, and a survey creation engine configured to create surveys, the database configured to store the created surveys; and a survey design machine having a network interface configured to provide access to the network and a network browser configured to communicate with the survey creation engine via the network to allow a user of the survey creation machine to create a survey through the survey creation engine of the host machine, the survey creation engine being configured to provide to the network browser of the survey design machine at least one function to select font of text used of a survey created by the survey creation engine.

6. A system for use with a network, the system comprising:

a database;

a host machine having a processor, a database interface configured to access the database, a network interface configured to provide access to the network, and a survey creation engine configured to create surveys, the database configured to store the created surveys; and a survey design machine having a network interface configured to provide access to the network and a network browser configured to communicate with the survey creation engine via the network to allow a user of the survey creation machine to create a survey through the survey creation engine of the host machine, the survey creation engine being configured to provide to the network browser of the survey design machine at least one function to select color scheme of a survey created by the survey creation engine.

* * * * *